United States Patent
Wang et al.

(10) Patent No.: US 6,859,251 B2
(45) Date of Patent: Feb. 22, 2005

(54) LIQUID CRYSTAL DISPLAY HAVING A CONCAVE SUBSTRATE AND MANUFACTURING METHOD THEREOF

(75) Inventors: Jyh Chau Wang, Tainan (TW); Cheng Che Pan, Tainan (TW); Chin Lung Ting, Tainan (TW)

(73) Assignee: Chi Mei Optoelectronics Corp., Tainan (TW)

(*) Notice: Subject to any disclaimer, the term of this patent is extended or adjusted under 35 U.S.C. 154(b) by 49 days.

(21) Appl. No.: 10/602,732

(22) Filed: Jun. 25, 2003

(65) Prior Publication Data

US 2004/0263767 A1 Dec. 30, 2004

(51) Int. Cl.[7] .............................................. G02F 1/1339
(52) U.S. Cl. ....................... 349/187; 349/158; 349/160; 349/190
(58) Field of Search ................................ 349/158, 160, 349/187, 189, 190

(56) References Cited

U.S. PATENT DOCUMENTS

| 4,526,818 A | * | 7/1985 | Hoshikawa et al. | ......... 428/1.5 |
| 5,307,190 A | * | 4/1994 | Wakita et al. | ............. 349/158 |
| 5,537,235 A | * | 7/1996 | Ishihara et al. | ............. 349/155 |

* cited by examiner

Primary Examiner—Tarifur R. Chowdhury
Assistant Examiner—Andrew Schechter
(74) Attorney, Agent, or Firm—Finnegan, Henderson, Farabow, Garrett & Dunner, L.L.P.

(57) ABSTRACT

A liquid crystal display and a method for manufacturing the liquid crystal display is disclosed. The method includes the steps of: (a) applying an adhesive onto at least one of a pair of substrates; (b) dispensing a liquid crystal material to at least one of the pair of substrates; (c) superposing one of the pair of substrates upon the other substrate; and (d) conducting a curing process of the adhesive in an air pressure greater than atmospheric pressure such that one of the substrates is concave toward the other substrate in the finished liquid crystal display.

6 Claims, 3 Drawing Sheets

LIQUID CRYSTAL DISPLAY HAVING A CONCAVE SUBSTRATE AND MANUFACTURING METHOD THEREOF

BACKGROUND OF THE INVENTION

1. Field of the Invention

The present invention relates to a liquid crystal display (LCD) and, more particularly, to a liquid crystal display with liquid crystal (LC) material sealed between two substrates using a one drop fill (ODF) process.

2. Description of the Related Art

Liquid crystal display typically comprises two glass substrates oppositely positioned and a liquid crystal layer interposed therebetween. Specifically, the glass substrates are assembled by the following steps. First, an adhesive seal material is applied, usually by either silkscreening or screen printing. An opening is left in the seal for liquid crystal (LC) material injection in the subsequent process. After the adhesive is applied, spacers are provided on one of the substrates to maintain a precise cell gap (between 3–10 micrometers) between the two substrates. Typically, the spacers are formed by spraying glass or plastic beads on one of the substrates or by using resin to fabricate photo-spacers onto one of the substrates via the photolithography process. The substrates are then aligned and laminated by heat and pressure to complete the cross-linking of the polymer. After the assembling process is completed, the assembled glass substrates are cut into individual LCD cells. After the liquid crystal material is injected into the LCD cell by vacuum injection (vacuum injection method), the opening that was left open for this injection is sealed.

Conventionally, the opening sealing process is done in a chamber under pressure in order to squeeze the excess liquid crystal material from the LCD cell and bring the sealing resin into the opening of the LCD. Specifically, increasing the air pressure in the chamber creates a pressing force against the outer surfaces of the LCD cell, and the excess liquid crystal material will be forced out of the opening of the LCD before the sealing resin is applied. Furthermore, the pressed LCD cell will gradually restores its original shape when the chamber is brought back to atmospheric pressure; and hence, the sealing resin will be sucked into the opening of the LCD.

The one drop fill (ODF) process generally comprises the steps of applying an adhesive onto the entire periphery of the first substrate, dropping the liquid crystal material to the first substrate, superposing the second substrate upon the first substrate, and curing the adhesive.

In comparison with vacuum injection method used widely in manufacturing liquid crystal displays, the ODF process significantly reduce costs for manufacturing liquid crystal displays and improve productivity on a mass production basis because, firstly, it significantly reduces the amount of LC material to be used and, secondly, it decreases the time required for injecting LC material. Therefore, a strong demand exists for the use of the ODF process in manufacturing liquid crystal displays.

According to the ODF process, a predetermined quantity of LC material is dispensed on a substrate using a liquid crystal dispenser. However, a problem can arise in that the quantity of the LC material in the LCD cell can become excessive or insufficient because of the dispensing accuracy of the dispenser and variation of the cell gap defined between the substrates. A shortage of the quantity of the LC material in the LCD cell results in so-called voids observed in the LCD cell. Gravity mura (wide-area pixel defect) can be observed when the quantity of the LC material in the LCD cell is excessive. Any liquid crystal display having such problems of voids or gravity mura is regarded as defective.

SUMMARY OF THE INVENTION

Therefore, it is an object of the present invention to provide a method for manufacturing a liquid crystal display with liquid crystal (LC) material sealed between two substrates using a one drop fill (ODF) process which allows a larger LC dispensing process window than conventional methods.

The basic steps of the "one drop fill" method are described below. First, an adhesive such as a UV curable sealant is formed in a peripheral region of one substrate, and the LC material is dropped onto the other substrate. With the two substrates held spaced apart, the substrates are placed within a vacuum chamber. When the substrates are still under atmospheric pressure, the lateral positions of the two substrates are mutually aligned. The air pressure within the vacuum chamber is then reduced, and under the condition of low pressure, the two substrates are brought together so that one substrate is superposed upon the other substrate. Thereafter, the sealant is cured by application of a suitable radiation such as a ultra-violet light.

To achieve the above listed and other objects, the adhesive is cured in a chamber maintained at greater-than-atmospheric pressure. Increasing the air pressure in the chamber creates a pressing force against the outer surfaces of the pair of substrates such that one of the substrates is concave toward the other substrate in the finished liquid crystal display. Therefore, even if the dispensed LC material is unable to totally fill the space between the two substrates after one substrate is superposed upon the other substrate, the expected voids can be eliminated when the adhesive is cured with the substrates disposed in a greater-than-atmospheric pressure.

According to one aspect of the present invention, the method further comprises a step of heating the two substrates during the curing process of the adhesive such that thermoplastic spacers provided between the two substrates are deformed to have different profiles in the finished liquid crystal display.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Figure 1:
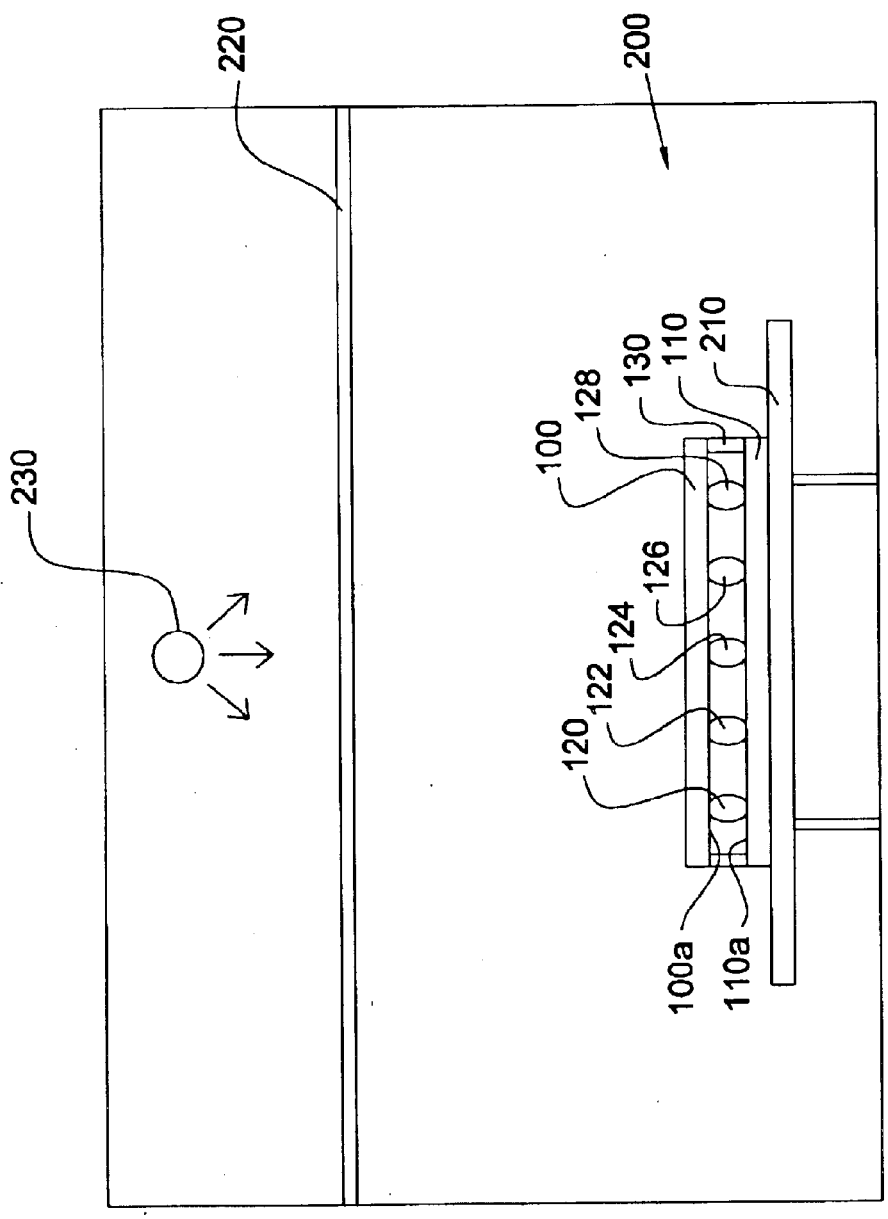
FIGS. 1–2 illustrate, in cross-sectional view, the major steps of manufacturing a liquid crystal display according to one embodiment of the present invention.

The present invention provides a method for manufacturing a liquid crystal display with liquid crystal (LC) material sealed between two substrates using a one drop fill (ODF) process. One substrate is typically provided with a plurality of scan bus lines formed parallel to one another, a plurality of data bus lines formed parallel to one another vertically to the scan bus lines, and TFTs and pixel electrodes formed like a matrix at intersections between the scan bus lines and data bus lines. The other substrate is typically provided with a light-shielding matrix (such as black matrix BM), a plurality of color filters for displaying colors and a transparent electrode such as an ITO electrode as a common electrode. As illustrated in FIG. 1, numerals 100 and 110 denote respective substrates with the bus lines, TFTs, the electrodes, and BM being omitted from the drawing for simplicity. Spacers are formed between the substrates 100 and 110 in order to maintain a cell gap between the substrates. Only five spacers, denoted with numerals 120, 122, 124, 126, and 128, are illustrated in the drawings for simplicity. Instead of scattered glass or plastic beads used in conventional LCD manufacturing process, the spacers used in this embodiment are formed by applying a resin layer over the entire surface of the substrate 100 or the substrate 110 with color filters provided thereon, and patterning the resin layer via a photolithography process. Since the resin layer is patterned by photolithography, the spacers can be provided selectively on a non-aperture area in TFT-LCDs thereby improving the aperture ratio.

Figure 2:
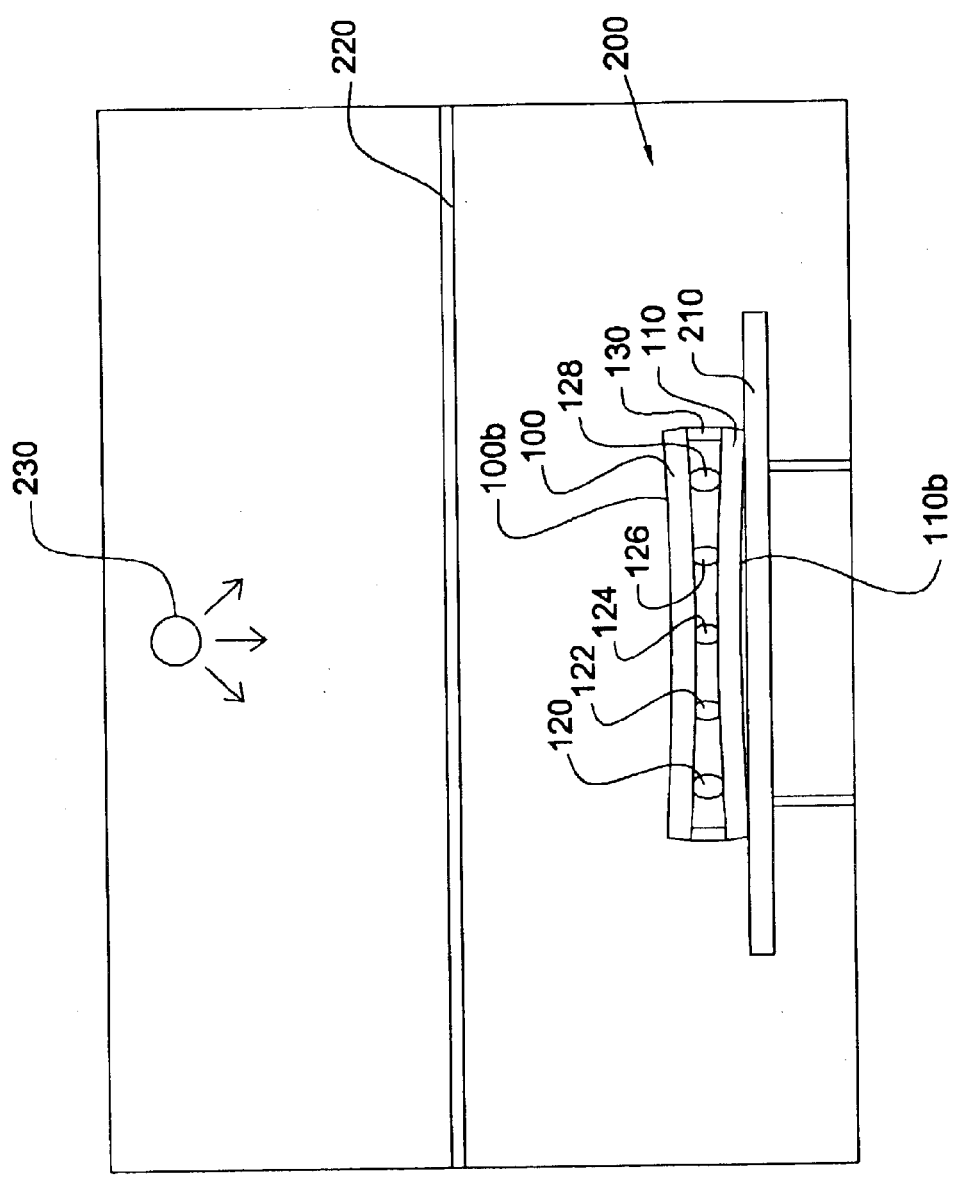

Methods for manufacturing LCDs according to one embodiment of the invention will now be described with reference to FIGS. 1–2. First, an adhesive 130 is applied onto one of the substrates 100 and 110 in a peripheral region of an inner surfaces 100a and 110a thereof. In this embodiment, the adhesive 130 is made of a resin material which is adapted to be subsequently cured by an irradiation such as an Ultraviolet (UV) Radiation. It should be understood that the adhesive 130 may be pre-cured before proceeding to subsequent steps. After the LC material is dropped onto the other substrate, the substrates 100 and 110 are placed in a chamber 200. Specifically, the substrate 110 is set upon a stage 210, and then the substrate 120 is positioned above and spaced apart from the substrate 110 with the inner surfaces 100a and 110a of the two substrates opposed to each other. When the substrates are still under atmospheric pressure, the lateral positions of the two substrates are mutually aligned. Air is then evacuated from the chamber 200, and, when a pressure lower than atmospheric pressure has been reached the two substrates 100, 110 are brought together so that one substrate is superposed upon the other substrate (see in FIG. 1). The air pressure within the chamber 200 is then restored to atmospheric pressure. The LC material thereby spreads to fill the space between the two substrates 100, 110, and extends to the inner periphery of the adhesive 130. At this time, as shown in FIG. 1, all of the spacers 120, 122, 124, 126, and 128 have a substantially uniform profile when seen from the side of the substrates 100 and 110.

Figure 3:
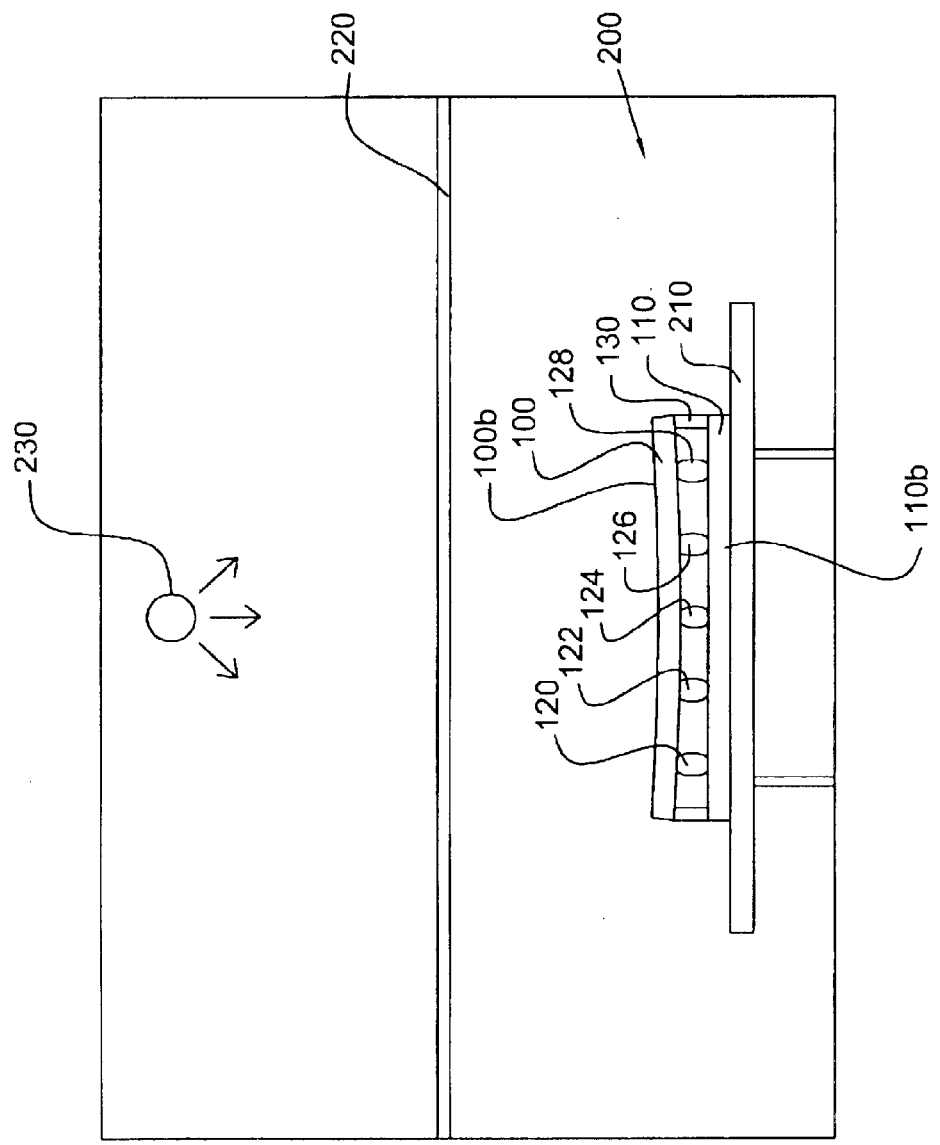
FIG. 3 illustrate, in cross-sectional view, the major steps of manufacturing a liquid crystal display according to another embodiment of the present invention.

Thereafter, the air pressure in the chamber is increased by moving a transparent plate such as a quartz plate 220 toward the two substrates 100, 110. When a pressure larger than atmospheric pressure has been reached, the adhesive 130 is cured by application of a suitable radiation such as a UV light emitted from a UV light source 230 through the quartz plate 220 into the adhesive 130. It is noted that increasing the air pressure in the chamber 200 creates a pressing force against the outer surfaces 100b, 100b of the substrates such that each of the substrates 100, 110 is concave toward the other substrate (see FIG. 2) thereby obtaining a finished liquid crystal display. Alternatively, as shown in FIG. 3, the pressing force created by the air pressure may cause only the substrate 100 to be concave toward the substrate 110.

It is noted that the spacers used in the present invention may be formed from a thermoplastic material, and a heating operation may be conducted during the curing process of the adhesive such that the thermoplastic spacers such as spacers 120, 122, 124, 126, and 128 are deformed to have different profiles thereby creating different cell gaps at different spacers (see FIG. 2 or FIG. 3) in the finished liquid crystal display.

The inventor has found during researches of conventional "one drop fill" methods that it is necessary to dispense very accurate quantity of LC material on the substrate. When the dispensed quantity of the LC material is lower than a minimum allowable dispensing quantity (hereinafter referred to as "Vmin"), the dispensed LC material is unable to totally fill the space between the two substrates, and a negative pressure may exist between the substrates of the finished liquid crystal display. As a result, voids are prone to form in the LC layer of the finished display panel. When the dispensed quantity of the LC material exceeds a maximum allowable dispensing quantity (hereinafter referred to as "Vmax"), gravity mura (wide-area pixel defect) is easily observed in a final inspection procedure wherein the finished liquid crystal display is placed at a right angle with respect to the level and heated. Mura defects are defined as areas of illumination (pixels on the substrate) which are different, or anomalous, from the neighborhood surrounding the defect, also termed Patterned Brightness Non-Uniformity (BNU). Any liquid crystal display having such problems of voids or gravity mura is regarded as defective. It is therefore a feature of conventional "one drop fill" methods that the dispensed quantity of the LC material must be accurately controlled within a very narrow process window defined by Vmax and Vmin. Furthermore, when conventional "one drop fill" methods are used to manufacture large-size LCD panels, the narrow dispensing process window associated with conventional "one drop fill" methods is especially apparent.

In contrast, the aforementioned methods of the present invention can achieve the same result as conventional methods even if the dispensed quantity of the LC material is lower than Vmin defined above, i.e., the aforementioned methods of the present invention allows a larger process window than the conventional methods. In the methods of the present invention, an extra empty space may still exist after one substrate is superposed upon the other substrate because the dispensed LC material is not enough to totally fill the space between the substrates. However, the extra empty space can be eliminated when the adhesive is cured with the substrates disposed in a greater-than-atmospheric pressure such that no voids will be formed in the LC layer of the finished display panel. This is because the greater-than-atmospheric pressure in the chamber creates a pressing force against the outer surfaces of the substrates such that each of the substrates is concave toward the other substrate thereby allowing the extra empty space to be eliminated.

Although the invention has been explained in relation to its preferred embodiment, it is to be understood that many other possible modifications and variations can be made without departing from the spirit and scope of the invention as hereinafter claimed.

What is claimed is:

1. A method for manufacturing a liquid crystal display comprising the steps of:

applying an adhesive onto at least one of a pair of substrates;

dispensing a liquid crystal material to at least one of the pair of substrates;

superposing one of the pair of substrates upon the other substrate; and conducting a curing process of the adhesive in an air pressure greater than atmospheric pressure such that one of the substrates is concave toward the other substrate in the finished liquid crystal display.

2. The method as claimed in claim 1, wherein each of the substrates is concave toward the other substrate in the finished liquid crystal display.

3. The method as claimed in claim 1, wherein at least one of the pair of substrates is provided with a plurality of thermoplastic spacers between the pair of substrates, and the method further comprises a step of heating the pair of substrates during the curing process of the adhesive such that the thermoplastic spacers are deformed to have different profiles in the finished liquid crystal display.

4. A method for manufacturing a liquid crystal display comprising the steps of applying an adhesive onto at least one of respective inner surfaces of a pair of substrates;

dispensing a liquid crystal material to at least one of the inner surfaces of the pair of substrates;

superposing one of the pair of substrates upon the other substrate with the respective inner surfaces opposed to each other in an chamber maintained at lower-than-atmospheric pressure;

increasing the air pressure in the chamber to above atmospheric pressure after one of the pair of substrates is superposed upon the other substrate; and conducting a curing process of the adhesive in the chamber maintained at greater-than-atmospheric pressure, wherein increasing the air pressure in the chamber creates a pressing force against the outer surfaces of the pair of substrates such that one of the substrates is concave toward the other substrate in the finished liquid crystal display.

5. The method as claimed in claim 4, wherein each of the substrates is concave toward the other substrate in the finished liquid crystal display.

6. The method as claimed in claim 4, wherein at least one of the pair of substrates is provided with a plurality of thermoplastic spacers between the pair of substrates, and the method further comprises a step of heating the pair of substrates during the curing process of the adhesive such that the thermoplastic spacers are deformed to have different profiles in the finished liquid crystal display.

* * * * *

UNITED STATES PATENT AND TRADEMARK OFFICE
CERTIFICATE OF CORRECTION

PATENT NO. : 6,859,251 B2
DATED : February 22, 2005
INVENTOR(S) : Wang et al.

It is certified that error appears in the above-identified patent and that said Letters Patent is hereby corrected as shown below:

<u>Column 5,</u>
Line 16, change "steps of applying an" to -- steps of:
                                              applying an --.
Line 22, change "an chamber" to -- a chamber --.

Signed and Sealed this

Seventh Day of June, 2005

JON W. DUDAS
*Director of the United States Patent and Trademark Office*